United States Patent [19]

Shiozawa et al.

[11] Patent Number: 4,482,227
[45] Date of Patent: Nov. 13, 1984

[54] FILM FEEDING METHOD

[75] Inventors: Kazuo Shiozawa, Konishiroku Apart 311, No. 1306-5, Naganuma-Cho, Hachioji-Shi, Tokyo; Seiichi Isoguchi, Tokyo, both of Japan

[73] Assignee: Kazuo Shiozawa, Tokyo, Japan

[21] Appl. No.: 442,251

[22] Filed: Nov. 17, 1982

[30] Foreign Application Priority Data

Nov. 24, 1981 [JP] Japan .................................. 56-186932
Nov. 24, 1981 [JP] Japan .................................. 56-186933

[51] Int. Cl.³ ............................................. G03B 17/36
[52] U.S. Cl. ............................... 354/173.11; 354/213; 354/218
[58] Field of Search ............... 354/173, 212, 213, 217, 354/218, 173.11

[56] References Cited

U.S. PATENT DOCUMENTS

| 4,278,337 | 7/1981 | Mashimo | 354/173 |
| 4,299,466 | 11/1981 | Harvey | 354/217 |
| 4,311,377 | 1/1982 | Matteson | 354/217 |
| 4,311,378 | 1/1982 | Freeman et al. | 354/217 |
| 4,362,370 | 12/1982 | Iwata et al. | 354/173 |

Primary Examiner—Russell E. Adams
Attorney, Agent, or Firm—James E. Nilles

[57] ABSTRACT

A film feeding method wherein film is fed by a film feed motor according to pulses generated per unit moving amount of film, characterized in that the overrun amount of the film feed motor is estimated from the supply voltage obtained at starting of the film feed motor or another electrically-operated drive machine fed with power from the same power source as the film feed motor operated prior to feeding of film. The drive of the film feed motor is controlled in expectation of the estimated overrun amount, or the calculated overrun amount of the film feed motor.

5 Claims, 7 Drawing Figures

FILM FEEDING METHOD

BACKGROUND OF THE INVENTION

1. Field of the Invention

The present invention relates to a film feeding method for accurately feeding film by a frame in a camera having an autowinder mechanism.

2. Description of the Prior Art

There have been various cameras having an autowinder mechanism. In such conventional cameras, film is fed by a frame by controlling a film feed motor through a switch adapted to turn ON/OFF every time film is wound up by a frame. Consequently, there is such a problem that owing to the variations in the output voltage of a battery (power source), film types and the motor load due to the ambient temperature change, the film feed amount may be inconstant, so that there may be fluctuations in the film frame distance.

SUMMARY OF THE INVENTION

It is, therefore, an object of the invention to provide a film feeding method wherein film is fed through control of a film feed motor by utilizing pulses generated per unit moving amount of film, characterized in that the overrun amount of the feed motor is estimated from a supply voltage at starting of the feed motor or an electrically-operated drive machine fed with power from the same power source as the feed motor, and the drive of the film feed motor is stopped in expectation of the estimated overrun amount, thereby allowing the film feed per frame to be constantly effected at all times independently of the above-mentioned factors.

Another object of the invention is to provide a film feeding method wherein film is fed through control of a film feed motor by utilizing pulses generated per unit moving amount of film, characterized in that the drive of the film feed motor is stopped in expectation of the calculated overrun amount of the film feed motor, thereby allowing the film feed per frame to be constantly effected at all times independently of the above-mentioned factors.

Other objects and features of the invention will be apparent from the following description taken in connection with the accompanying drawings.

DESCRIPTION OF THE PREFERRED EMBODIMENTS

Figure 1:
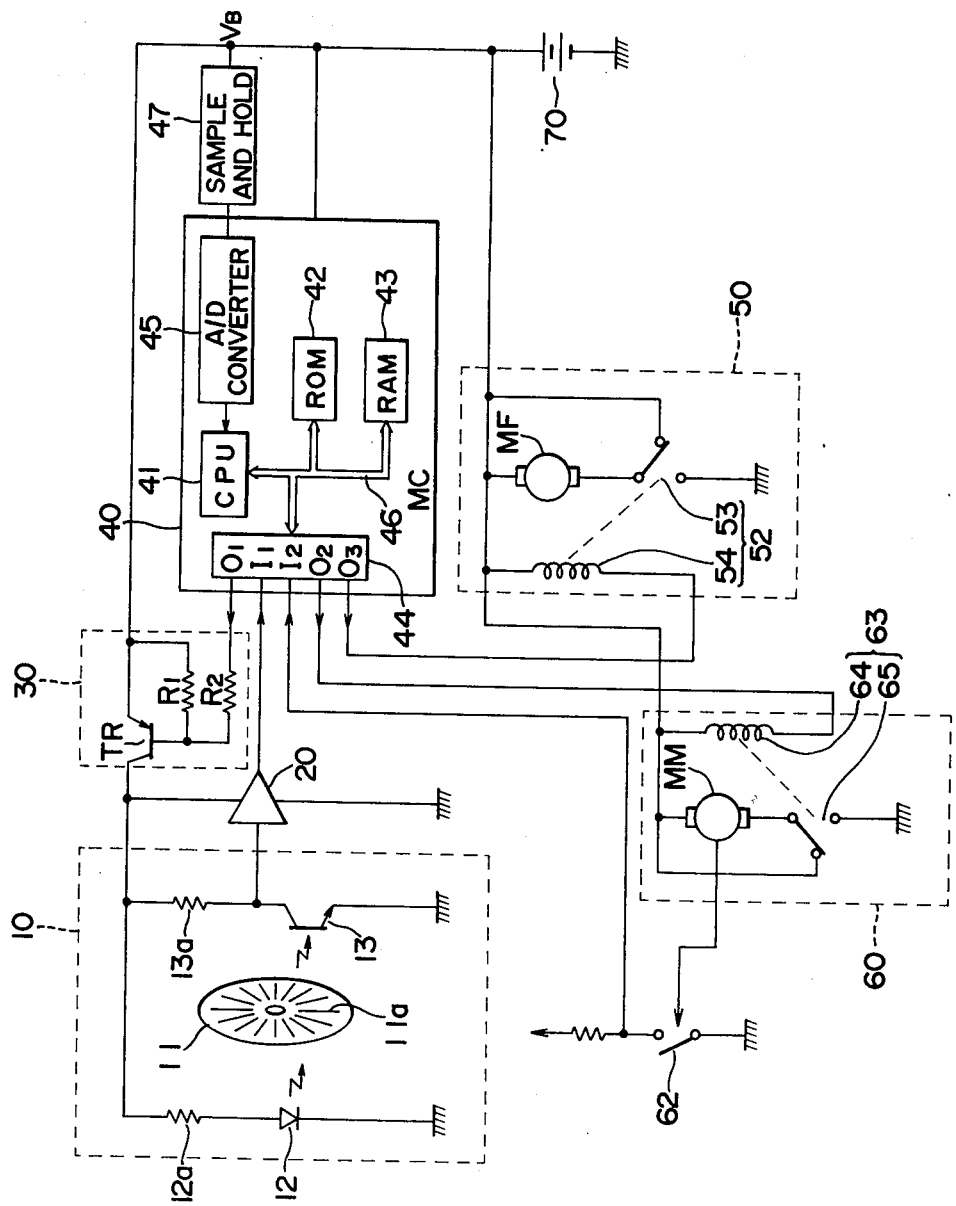
FIG. 1 shows a preferred embodiment of a film feeding method according to the invention.

The invention will be described hereinunder in greater detail with reference to the accompanying drawings. FIG. 1 shows a preferred embodiment of a film feeding method according to the invention. A reference numeral 10 designates a pulse generator, 20 designates a waveform shaping circuit, 30 designates a switching circuit, 40 designates a one-chip microcomputer (referred to as "MC" hereinafter), 50 and 60 designate motor driving circuits respectively, and 70 designates a battery.

The pulse generator 10, which delivers pulse signals per unit moving amount of film when film is wound up, comprises a Siemens' star-shaped slit disc (referred to as "Siemens' star" hereinafter) 11 and an LED 12 and a phototransistor 13 which are disposed facing to each other with the Siemens' star 11 therebetween. The Siemens' star 11, which is a disc having a plurality of slits 11a radially formed at equal pitches, is adapted to interrupt the beam being applied to the phototransistor 13 from the LED 12 by rotating. The output voltage of the battery 70 is applied to the LED 12 and the phototransistor 13 through resistors 12a and 13a respectively.

Figure 2:
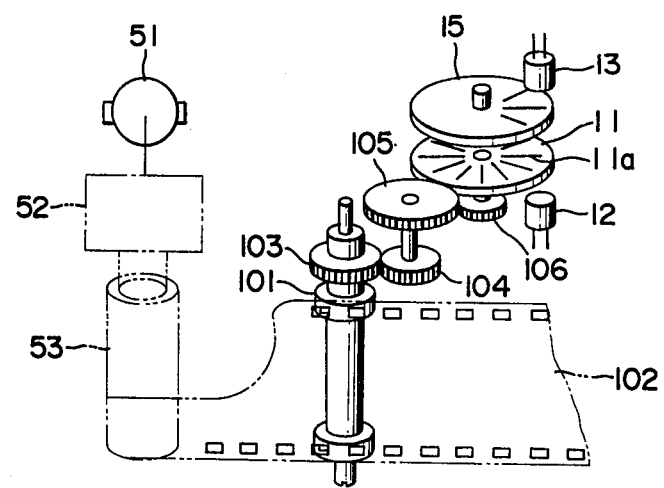
FIG. 2 schematically shows the arrangement of the part of a Siemens' star.

The mechanism part for practically rotating the Siemens' star 11 is arranged as shown in FIG. 2. In other words, the output shaft of a film feed motor 51 is connected with a reel 53 through a reduction gear train 52. Film 102 is fed by means of the rotation of the reel 53, while a sprocket 101 is rotated in accordance with the feed of the film 102. The rotation of the sprocket 101 is transmitted to gears 103-104-105-106 constituting a speed-up gear train so as to rotate the Siemens' star 11 connected integrally with the gear 106. A reference numeral 15 denotes a fixed Siemens' star disposed coaxially with the Siemens' star 11. By the above-described arrangement, pulse signals are delivered from the phototransistor 13 per unit moving amount of the film 102.

The waveform shaping circuit 20, which is such as a Schmidt trigger circuit, is for shaping the pulse signal delivered from the phototransistor 13 into a pulse signal suitable for the MC 40. The switching circuit 30, which is for ON/OFF controlling the power source for supplying power to the pulse generator 10 and the waveform shaping circuit 20 in response to the control signal delivered from the MC 40, comprises a transistor TR and resistors $R_1$, $R_2$. The output voltage V of the battery 70 is applied to the emitter of the transistor TR. In addition, the resistor $R_1$ is connected between the base and emitter thereof. Moreover, the base is connected to an output port $O_1$ of the MC 40 through the resistor $R_2$. When the signal thereof is LOW, the transistor TR is ON. To the contrary, when the signal is HIGH, the transistor TR is OFF.

The MC 40, which runs a given program and reads the pulse signal for controlling each of parts, comprises a ROM 42 for storing a program, a RAM 43 for storing data, a central processing unit (referred to as "CPU" hereinafter) 41 as the control center, an I/O port 44 for feeding and receiving data and control signals, a sample and-hold circuit 47 for sampling and holding a voltage $V_B$, and an A/D converter 45 for A/D converting a voltage $V_B$ through a sample and hold circuit 47 and feeding it to the CPU. The CPU 41 conducts transfer of data and control signals between the ROM 42, the RAM 43 and the I/O port 44 respectively through a bus 46. The I/O port 44 generally comprises input ports and output ports each constituted by a register or latch for temporarily storing data and a decoder for addressing and selecting input/output circuits. An input port $I_1$ receives the output signal from the waveform shaping circuit 20, while an input port $I_2$ receives a signal from a switch 62. An output port $O_1$ transmits a control signal to the switching circuit 30, while output ports O₂, O₃ transmit control signals to the motor driving circuits 60, 50 respectively.

The motor driving circuit 50, which is for driving a film feed motor MF, is adapted to interrupt the current flowing through the motor MF by means of a transfer switch 53 of a relay 52. The switch 53 is ON/OFF controlled by means of energization of a solenoid 54 of the relay 52 so that when the switch 53 is made OFF the motor current is cut to brake the film feed motor MF.

The other motor drive circuit 60 is for driving a shutter/mirror charging motor MM connected to the same power source 70 as the film feed motor MF. The motor MM is driven and stopped in such a way that with the switch 62 closed, a signal is fed to the input port I₂ of the MC 40, which makes the output port O₂ LOW, thereby to energize a solenoid 64 of a relay 63 in order to making a switch 65 ON/OFF.

Figure 3:
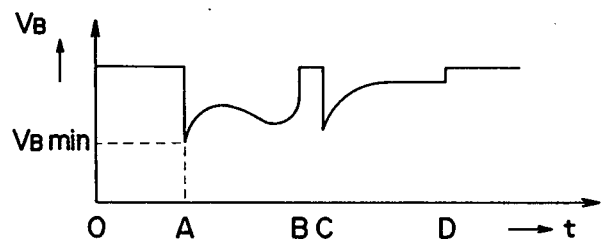
FIG. 3 shows the voltage fluctuations when a motor is driven.

Here, as the battery deteriorates, the open-circuit voltage $E_o$ thereof lowers and the internal resistance r rises. Therefore, the voltage $V_B$ across the battery becomes considerably low when a heavy load such as the motor is connected thereto. FIG. 3 shows this state.

Figure 4:
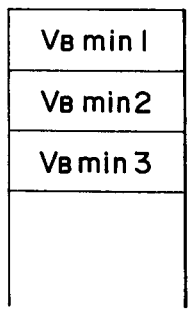
FIG. 4(A) and FIG. 4(B) show examples of a table of correspondence between $V_B$ min and B in an ROM respectively.
Figure 4:
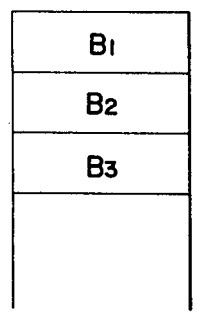
Figure 4:
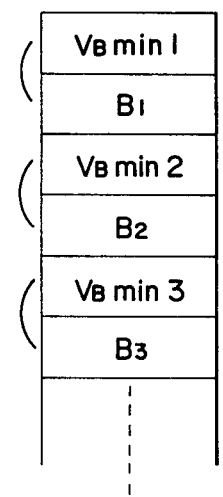

In FIG. 3, a point A is a starting point of the mirror/shutter charging motor MM, a point B is a stop point of the motor, a point C is a starting point of the film feed motor MF, and a point D is a stop point of the motor. The battery voltage $V_B$ exceedingly lowers at the points A and C as shown in FIG. 3, since the motor starting current is larger than the steady-state current as well known. Consequently, if this voltage is taken as $V_B$ min, the overrun amount of the film feed motor MF can be estimated by measuring the $V_B$ min. Previously stored in the ROM is a chart showing the correspondence between the $V_B$ min and a control index pulse number B obtained in consideration of the overrun amount (the number of pulses equivalent to the overrun amount). Shown in FIG. 4(A) and FIG. 4(B) are examples of a chart showing correspondence between the $V_B$ min and the number B in the ROM respectively.

Generally, the period of time needed for charging a mirror and a shutter or feeding film by a frame ($\overline{AB}$, $\overline{CD}$ in FIG. 3) by means of a motor is about 100-200 ms. Therefore, the period of time when the voltage is low is exceedingly short. In order to accurately known the $V_B$ min, the system is arranged by employing a sample and hold circuit 47 and the A/D converter 45 which need less than several ms for sampling and holding and A/D conversion respectively.

Figure 5:
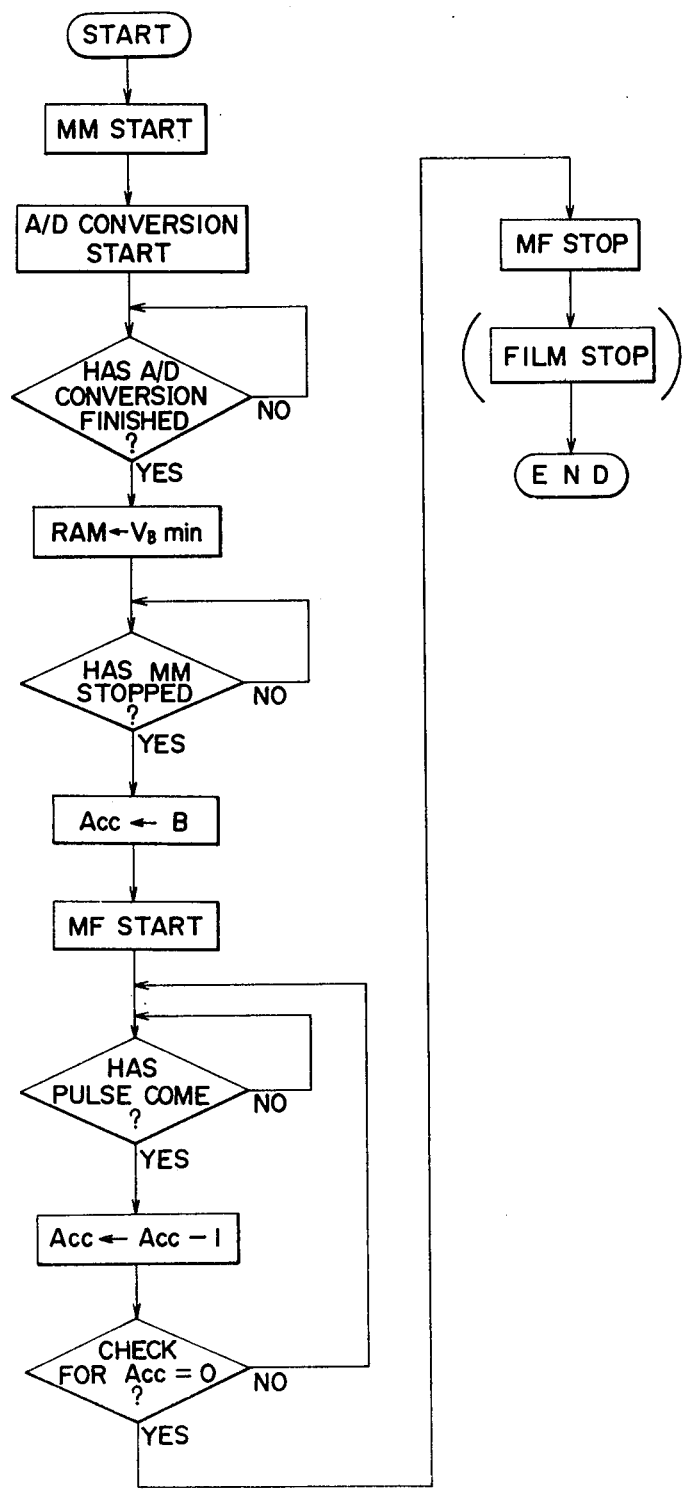
FIG. 5 is a flow chart for illustrating the operation of a system employed in the preferred embodiment.

The operation of the system thus arranged will be described hereinunder with reference to a flow chart shown in FIG. 5. On completion of photographing, the switch 62 is closed by the shutter run and the mirror operation, and a LOW signal is fed to the input port I₂ of the MC 40. Detecting the signal, the MC 40 makes the output port O₂ LOW, actuating the relay 63 to close the switch 65 in order to start the shutter/mirror charging motor MM. Simultaneously, an A/D conversion of the voltage $V_B$ is started. On completion of the A/D conversion, the $V_B$ which is a $V_B$ min is written into the RAM. Moreover, the motor MM stops. The pulse number B representing the overrun amount, previously experimentally obtained, corresponding to the $V_B$ min written into the RAM is loaded from the correspondence chart in the table of the ROM into an accumulator Acc. Then, the film feed motor MF is started, and the number of pulses (the pulses fed to the input port I₁) generated in accordance with the movement of the film is counted. Every time the pulse is fed, 1 is subtracted from the number stored in the accumulator Acc, and when the number stored in the accumulator Acc is 0, i.e., when the number of counted pulses is B, the output port O₃ is made HIGH in order to stop the motor MF. Thereafter, the film stops after overrunning as estimated. Thus, the film 102 is constantly fed by a given amount.

The film feed motor MF does not immediately stop but overruns, although the drive is stopped. The overrun amount closely relates to the time TMM needed for charging the shutter. It has been known that the longer the time TMM (the higher the deterioration degree of the battery performance), the smaller the film overrun amount. On the other hand, since the number of pulses C (the number of pulses fed to the port I₁) generated in accordance with the movement of the film represents the moving amount of the film, it is possible to experimentally obtain an estimated pulse number C corresponding to the value of the time TMM from the relationship between the film overrun amount. The pulse number C is determined such that if the motor MF is stopped after the film has been moved by an amount corresponding to the pulse number C, it is possible to feed the film by a frame in expectation of the film overrun amount. Consequently, for feeding the film by a frame in expectation of the film overrun amount, the index pulse number B for controlling the film feed amount (the feed amount measured from the start to the stop of the film feed motor) is obtained as follows: $B=A-C$, and the relationship between the value of the time TMM and the number B is obtained, where A is the number of pulses obtained when the film is accurately fed by a frame. According to another preferred embodiment of the invention, therefore, it is possible to feed the film in expectation of the overrun amount by measuring the time TMM. According to the embodiment, the relationship between the time TMM and the number B is previously stored in the ROM 42 of the MC 40 in the form of a function or correspondence chart.

Figure 6:
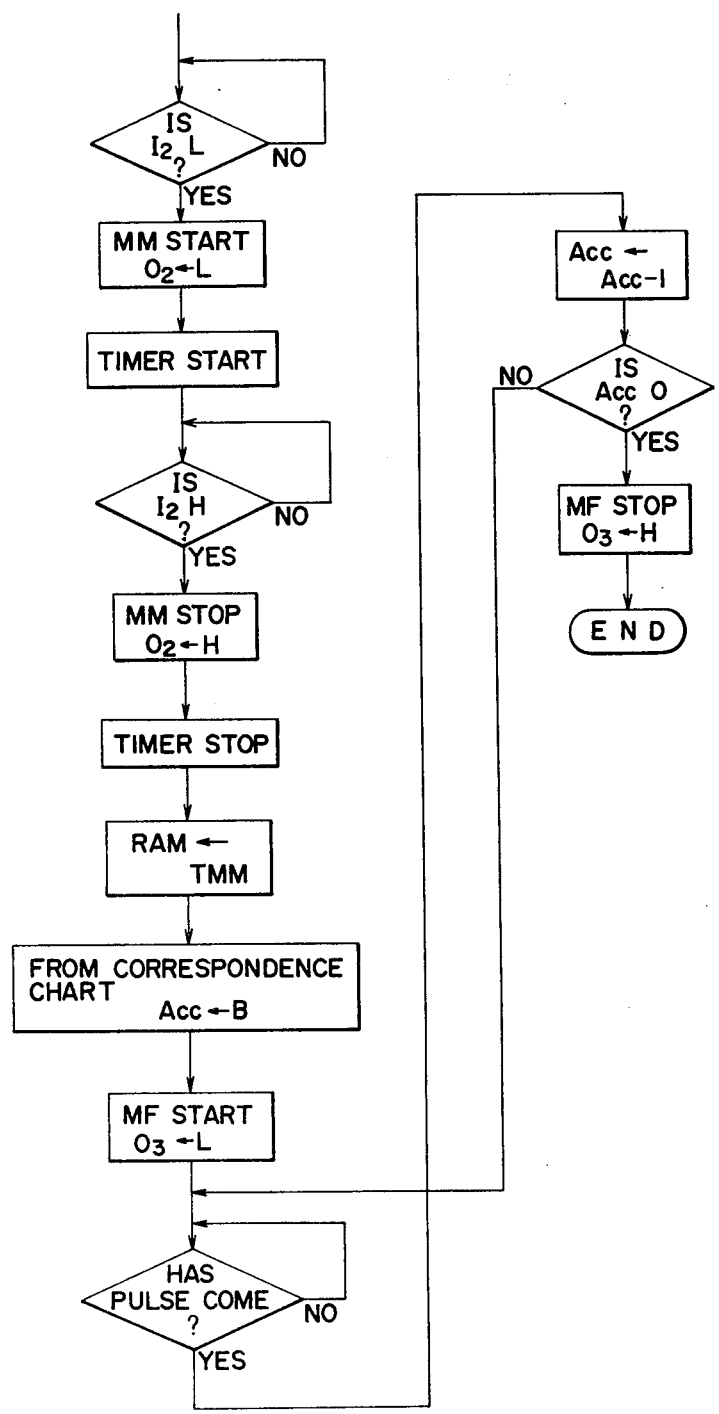
FIG. 6 is a flow chart for description of the operation of a system employed in another preferred embodiment of the invention.

The operation of the system thus arranged will be described hereinunder with reference to a flow chart shown in FIG. 6. On completion of photographing, the switch 62 is closed by means of the shutter run and the mirror operation, so that a LOW signal is fed to the input port I₂ of the MC 40. Detecting the signal, the MC 40 makes the output port O₂ LOW, actuating the relay 63 to close the switch 65 in order to rotate the shutter/mirror charging motor MM. At this time, a timer in the MC 40 is started to count seconds. On completion of charging the shutter and the mirror, the switch 62 is opened, so that a HIGH signal is fed to the input port I₂ of the MC 40. In response to the signal, the MC 40 makes the output port O₂ HIGH in order to stop the motor MM. Simultaneously, the MC 40 stops the timer and stores the period of time TMM during which the motor MM is operative into the RAM 43. According to the time TMM stored into the RAM 43, the MC 40 loads the pulse number B previously stored in the ROM 42 into the accumulator Acc. Moreover, the MC 40 makes the output port O₃ LOW in order to start the film feed motor MF and at the same time, starts counting the number of pulses fed to the input port I₁. Every time the pulse is fed, 1 is subtracted from the number stored in the accumulator Acc, and when the number stored in the accumulator Acc in 0, i.e., when the number of counted pulses is B, the output port O₃ is made HIGH in order to stop the motor MF. Then, the film stops after overrunning as estimated. Thus, the film 102 is constantly fed by a given amount.

As will be fully understood from the foregoing description, the invention permits the film to be fed by a frame substantially independently of the variations in the battery voltage, film types or the motor load due to the ambient temperature change. Accordingly, the frame distance is maintained constant at all times.

What is claimed is:

1. A method of feeding film in segments of predetermined length in apparatus employing a film feed motor energizable from an electric power source and which tends to overrun after it is deenergized, said method comprising the following steps to feed one of said segments:

energizing said film feed motor from said electric power source sufficient to feed said film for a first length a little shorter than said predetermined length, and de-energizing said film feed motor and allowing said motor to overrun sufficient to feed said film for the remaining portion of said predetermined length.

2. A method according to claim 1 further including the steps of determining the total length of film feed needed to move said film said predetermined length, estimating the length that said film feed motor will cause to overrun on the basis of the measured voltage level of said electric power source when said film feed motor is energized, and de-energizing said film feed motor when said estimated length remains whereby said film is fed for the remaining portion of said predetermined length.

3. A method of feeding film in segments of predetermined length in apparatus which employs an electric power source subject to a decline in voltage and also employs a film feed motor energizable from said electric power source and which tends to overrun after it is de-energized, said method comprising the steps of:

determining the total length needed to feed said film for said predetermined length, estimating the length that said feed motor will cause to overrun on the basis of the voltage of the electric power source at the time said feed motor is energized, energizing said film feed motor from said electric power source for a first length equal to the difference between said total length and said estimated length to thereby feed said film for a first portion of said predetermined length, measuring the length of film fed by said film feed motor, and de-energizing said film feed motor after said first length has been fed and allowing said film feed motor to overrun for said estimated length to thereby feed said film for the remaining portion off said predetermined length.

4. A method according to claim 3 wherein said apparatus further comprises an electrically-operated driven machine energizable from said electric power source and wherein said method comprises the further step of estimating said first length on the basis of the voltage of said electric power source at the time said electrically-operated drive machine is energized and before said feed motor is energized.

5. A method of feeding film in segments of predetermined length in apparatus which employs an electric power source subject to a decline in voltage, a film feed motor energizable from said electric power source and which tends to overrun after it is de-energized, an electrically-operated drive machine energizable from said electric power source, means for measuring the voltage of said electric power source, means for measuring the amount of film length which has been fed, and a memory, said method comprising the steps of:

determining the total length needed to feed said film for said predetermined length, and storing this information in said memory, estimating the length that said feed motor will cause to overrun on the basis of the measured voltage of the electric power source at the time said electrically-operated drive machine is energized and storing the estimate in said memory, energizing and then de-energizing said electrically-operated drive machine, energizing said film feed motor from said electric power source after said drive machine is de-energized for a first length equal to the difference between said total length and said estimated length to thereby feed said film for a first portion of said predetermined length, measuring the length of film fed by said film feed motor and providing such information to said memory, and de-energizing said film feed motor in response to information from said memory after said first length has been fed and allowing said film feed motor to overrun for said estimated length to thereby feed said film for the remaining portion of said predetermined length.

* * * * *

UNITED STATES PATENT AND TRADEMARK OFFICE
CERTIFICATE OF CORRECTION

PATENT NO.   : 4,482,227
DATED        : November 13, 1984
INVENTOR(S)  : Kazuo Shiozawa and Seiichi Isoguchi It is certified that error appears in the above-identified patent and that said Letters Patent are hereby corrected as shown below:

On the title page, Item [75] should read:

[73]  Assignee:  Konishiroku Photo Industry Co., Ltd.
                 Tokyo, Japan Signed and Sealed this Eleventh Day of June 1985

[SEAL]

Attest:

DONALD J. QUIGG

Attesting Officer   Acting Commissioner of Patents and Trademarks